March 15, 1932. A. C. GAYNOR Re. 18,385

ELECTRIC SWITCH

Original Filed Aug. 2, 1926 3 Sheets-Sheet 1

Inventor
Arthur C. Gaynor
By
Church & Church
Attorneys

A. C. GAYNOR

March 15, 1932. ELECTRIC SWITCH Re. 18,385

Original Filed Aug. 2, 1926 3 Sheets-Sheet 2

Inventor

Arthur C. Gaynor

By Church & Church

Attorneys

March 15, 1932.

A. C. GAYNOR

ELECTRIC SWITCH

Re. 18,385

Original Filed Aug. 2, 1926 3 Sheets-Sheet 3

Inventor

Arthur C. Gaynor

By Church & Church

Attorneys

Reissued Mar. 15, 1932

Re. 18,385

UNITED STATES PATENT OFFICE

ARTHUR C. GAYNOR, OF STRATFORD, CONNECTICUT

ELECTRIC SWITCH

Original No. 1,690,780, dated November 6, 1928, Serial No. 126,530, filed August 2, 1926. Application for reissue filed November 6, 1930. Serial No. 493,873.

My invention relates to electric switches and has to do, more particularly, with electric switches of the snap type.

One object of my invention is to provide an electric snap switch of such construction as to prevent arcing when the circuit is broken. A further object of my invention is to provide a snap switch construction such that it can be easily and expeditiously manufactured and assembled at an exceedingly low cost of material and assembly.

Further objects, and objects relating to details and economies of construction and operation will definitely appear from the detailed description to follow. In one instance I accomplish the objects of my invention by the devices and means set forth in the following specification. My invention is clearly defined and pointed out in the appended claims. A structure constituting a preferred embodiment of my invention is illustrated in the accompanying drawings, forming a part of this specification, in which:

In the drawings, the same reference numerals refer to the same parts throughout the several views and the sectional views are taken looking in the direction of the arrows at the ends of the section lines.

Figure 1:
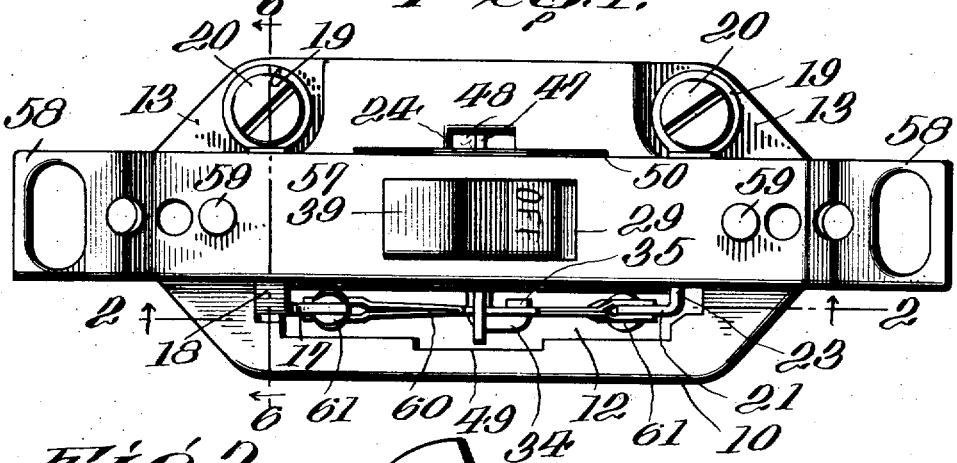
Figure 1 is a plan view of a switch embodying my invention.

As stated above, one of the objects of my present invention is to provide a snap switch construction in which arcing will be more effectively prevented than in prior switches of this type. Opening an electric circuit is attended, in many cases, by a rise in the voltage in the circuit adjacent to the point of opening. This is often sufficient to overcome the resistance of the air and raise its temperature to such a degree that the current will persist thereby creating an arc. I propose, in my improved snap switch, to prevent the formation of such an arc by providing a mass of insulating material of much greater heat capacity than air and of good heat absorbing qualities located very close to the path which the contact blade takes as it leaves its engagement with the contact jaw. I propose to treat the insulating material of the base, or that portion of its adjacent the contact blade and the contact jaw, in such a way as to increase its capacity for absorbing heat so that the heat generated by the opening of the circuit, which would otherwise tend to create an arc, is readily absorbed by the portion of the base which is adjacent to such points of contact. I further propose to reduce the tendency toward arcing by reducing the weight of the moving parts of the switch, thereby increasing the speed at which such moving parts work. By speeding up the contact blade in this way, it may move a sufficient distance from the contact jaws to prevent arcing before sufficient time has elapsed to raise the temperature of the air between the jaws and the retreating blade to a point at which an arc is formed. Snap switches usually include at least two contact jaws, one of which is customarily located near the bottom of the insulating base and is provided with a vertical lead running from the contact jaw toward the top face of the base. An arc is apt to become established between this vertical lead and the contact blade and I propose to prevent the formation of such an arc by interposing a solid insulating barrier between the path of movement of the adjacent end of the contact blade and such vertical lead from the contact jaw. To this end, I propose to provide a laterally offset recess at the end of the slot in the insulating base, in which the contact blade moves, and to offset the vertical lead from the contact jaw and locate such vertical lead to the offset recess of the base.

In order to reduce the cost of manufacture, I have provided a snap switch construction which is made of a few simple parts which can be quickly and easily assembled together. The crank shaft is made of a piece of wire bent to the desired formation and can be made very quickly and economically. Heretofore, it has been regarded as necessary to fasten the contact blade rigidly to the crank shaft. This necessitated the adjustment of the contact jaws so that they would aline with the contact blade, after the latter had been assembled in the insulating base. This required a considerable amount of adjusting and was an expensive proposition. I propose to connect the contact blade non-rigidly with the crank shaft, so that the crank imparts an oscillatory or snap movement to the blade but the blade is capable of lateral displacement with reference to the crank. The blade floats, as it were, and is permitted to adjust itself into contact with the contact jaws and the adjustment of these jaws into alinement with the contact blade is unnecessary. This has the further advantage that it reduces the cost of and simplifies the connection between the contact blade and the crank. I further propose to provide means for guiding this floating contact blade into engagement with the contact jaws. For instance, the base may be so formed as to guide the contact blade into proper engagement with the contact jaws. This simple and non-rigid connection between the contact blade and the crank also aids in reducing the weight of the moving parts and thereby speeds up the contact blade and prevents the formation of an arc.

The bracket in which the operating parts are mounted is of very simple construction and may be provided with stop lugs turned inwardly to engage a portion of the crank shaft. I also propose to provide an improved actuator lever which is formed at its lower end with a spring seat so that a spring may be compressed between the crank of the crank shaft and the lower end of this actuator lever, without providing any special formation at either end of the spring for engagement or connection with the lever or the crank shaft. This reduces the cost of forming the spring as all that needs to be done is to form a coil spring of suitable length. I propose to provide an actuator lever which is so formed that the shock incident to limiting the movement of the lever, in one position or the other, is taken by metal parts instead of by the insulating material which is molded around such metal parts.

I further propose to reduce the cost of manufacture of this switch by eliminating the screws customarily used for mounting the contact jaws in position in the base. To that end, I propose to so form the base and the contact jaws that they are held against all movement with respect to each other except vertical movement and to prevent such vertical movement by means of the bridge plate which extends over these contact members and clamps them against the base. Similarly, I reduce the cost of construction and assembly by providing the insulating base with a recess or slot in which the top face of the supporting bracket fits and which holds said supporting bracket against movement in a horizontal plane. The bridge plate also extends over this supporting bracket and being connected to the base, clamps such bracket against vertical movement. This makes a very simple and cheap construction in which the bracket and the base co-act to limit these elements to vertical movement only and the bridge plate serves as a single member preventing this vertical movement.

Referring to the accompanying drawings, in which I have shown a preferred embodiment of my invention, the insulating base 10 is provided with a recess or socket 11, which receives the operating parts of the switch and with a slot 12, communicating with such recess, and receiving the contact jaws and movable contact blade. I prefer to make the base of the porcelain and to treat certain portions of the base, that is, the walls of the slot which receive the contact blade and the contact jaws, by spraying a coating of lacquer thereon in order to increase the heat absorbing qualities of such parts for the purpose of preventing arcing. I have found, however, that a satisfactory result can be obtained by forming the base of bakelite or of cold molded insulation, a material well known on the market and consisting of a pressed and baked mixture of pitch and asbestos. If the base is made of bakelite, or cold molded insulation, no further treatment is necessary inasmuch as it possesses the necessary heat absorbing qualities for preventing arcing. If porcelain be used however the portion of the base adjacent the path of the contact blade should be sprayed with lacquer as described. I have found, further, that the application of a coating of paint or paste to such portions of the base will so increase their heat absorbing qualities as to give the result wished for in preventing the formation of an arc. This feature of my invention is described and claimed in my Patent No. 1,739,835, granted December 17, 1929, on a divisional application Serial No. 160,211, filed January 10, 1927.

Figure 7:
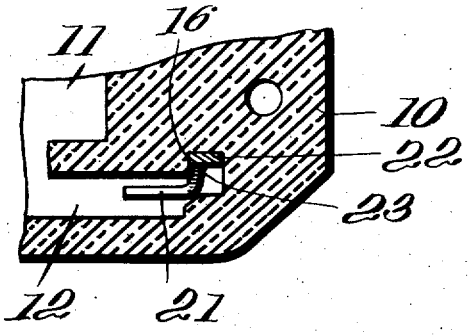
Fig. 7 is a sectional view taken on the line 7—7 of Fig. 2.

The insulating base has terminal seats 13 formed therein and transverse grooves 15 are provided in the top surface of the base, leading from opposite ends of the slot 12 to said terminal seats. A hole 14 is provided in each terminal seat to receive the lower end of a binding screw 20. The contact jaws 17 and 21 are located in the slot 12, at opposite ends thereof, the contact jaw 17 being located near the top of the slot while the jaw 21 is located near the bottom thereof. The contact jaw 17 is formed integral with a lead portion 18 which fits in one of the transverse grooves 15 and is provided with a terminal portion 19 seating on the terminal seat 13. A binding screw 20 is screwed into the terminal portion 19 and projects into the corresponding hole 14. The contact jaw 21, has formed integral therewith a vertical portion 22 which is located in an offset vertical recess 16 formed in the base at the corresponding end of the slot 12, as indicated in Fig. 7. From the upper end of this vertical portion 22 there extends the transverse portion 18 fitting in the corresponding slot 15 and ending in a terminal portion 19 on the seat 13 and receiving a binding screw 20 which projects into the hole 14, as in the case of the contact member at the opposite end of the base. The contact jaw 21 is offset, as at 23, from the lower end of the vertical portion 22. This feature of my invention is described and claimed in my Patent No. 1,739,835, granted December 17, 1929, on a divisional application Serial No. 160,211, filed January 10, 1927.

The operating parts of the switch are supported by a sheet metal bracket comprising a top plate 24, having a central opening 29 therein through which the actuator lever extends, and a pair of spaced depending arms 25. Each of these arms has a bearing 26 formed therein for the crank shaft and is provided with an entrance slot 27 through which the crank shaft may be inserted to its position in said bearing. One of the arms 25 has integral lugs 28 formed thereon, and projecting inwardly toward the opposite arm, which acts as stops to limit the oscillatory movement of the crank shaft in said bearing. This shaft is made of a piece of wire bent to the required form and is provided with outturned bearing portions 31 which are journaled in the bearing seats 26 formed in the arms 25 of the bracket 24. The crank portion 32 of the crank shaft is located between the depending arms 25, and the central portion of this crank is bent upwardly to form the hump 33, which provides a seat for the compression spring 36. It is of considerable importance that the hump 33 should fit snugly within the lowermost coil of the spring 36. This hump should engage the inside diameter of the spring snugly because if the spring may slip from side to side on the crank, which it would do if it is not snugly supported, this will interfere with the transmission of energy and the crank will not develop sufficient speed to break the circuit quickly enough. The wire forming the crank shaft has a lateral projection 34, extending from the end of one bearing portion 31, and a part 35, bent back parallel to the bearing portion 31, which form a non-circular projecting end for said crank shaft, by means of which a non-rigid connection is made between the crank shaft and the contact blade. The coil spring 36 is compressed between the hump 33 on the crank portion of the crank shaft and the lower end of an actuator lever 39. The lower end of said lever has an edge portion 37 of semi-circular outline with a pair of shoulders 38 adjacent the ends of this semi-circular portion, which forms a spring seat for the upper end of the coil spring 36, the semi-circular portion 37 of the lever fitting within the end of the coil spring and preventing its lateral displacement while the hump 33 on the crank portion fits within the opposite end of the coil spring 36.

Figure 10:
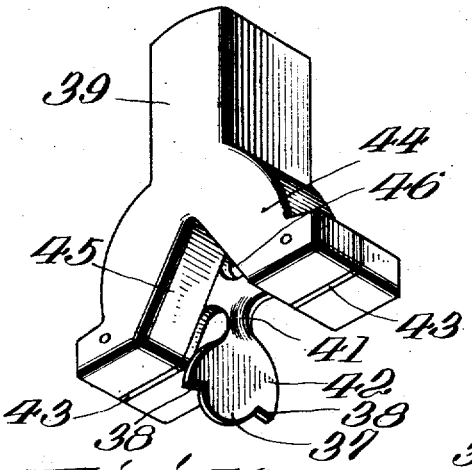
Fig. 10 is an enlarged perspective view of the actuator lever.
Figure 11:
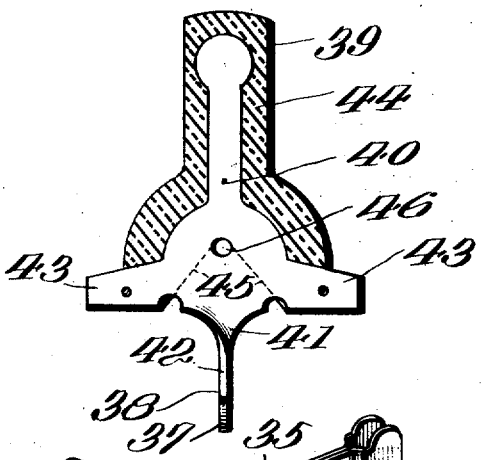
Fig. 11 is a vertical sectional view through the actuator lever.

The actuator lever 39 comprises a sheet metal member having an upper portion 40 constituting a handle and two laterally extending arms 43. The lower portion 42 of the lever 40 is bent or twisted, as at 41, into a plane at right angles to that of the upper portion of the lever, and this lower portion is formed with the semi-circular edge portion and the shoulders to constitute a spring seat, as illustrated in Fig. 10. The insulation 44 is molded around the sheet metal member constituting the body of the lever and it will be observed that this insulation has a V-shaped recess 45 formed therein, the apex of this V-shaped recess being located in line with the opening 46 which receives the pivot pin for the lever. The edges of the arms 43 are exposed at the outside of the insulation so that the shock incident to the contact of such arms with the bracket, in limiting the movement of the actuator lever, is taken by the sheet metal member rather than by the insulation.

This actuator lever is pivotally mounted in the bracket 24. Openings 30 are formed in the depending arms 25 of said bracket, adjacent the top plate thereof, which receive a straight pivot pin 47, passing through said openings 30 and through the openings 46 in the lever. It is to be noted that this is a straight pin, which may be made from a piece of wire and requires no heading over or other formation in order to prevent lateral displacement of the pin. When the operating assembly is mounted in position in the insulating base, the ends of the pivot pin 47 are located adjacent the side walls of recesses 48 and 49 formed in said base and this prevents the lateral displacement of said pivot pin.

A seat 50 is formed in the upper surface of the insulating base, of such a size and shape that the top plate 24 of the bracket fits therein, and such bracket is held against movement in a horizontal plane by the cooperation of the top plate with such seat. A strip 56 of insulating material is applied to the upper surface of the base and extends across the top plate of the bracket 24 and the contact leads 18 in the grooves 15. A bridge plate 57 is positioned on top of this strip of insulating material and has the usual offset ends 58 provided with openings by means of which the switch may be attached in position. This bridge plate is secured to the insulating base by means of screws 59 extending from the bottom of the base through holes formed therein and screwed into said bridge plate. The bridge plate, therefore, serves to clamp the contact leads 18 in the grooves 15 and to clamp the bracket 24 in position in the seat 50, and thereby prevents any vertical movement of such parts.

Figure 12:
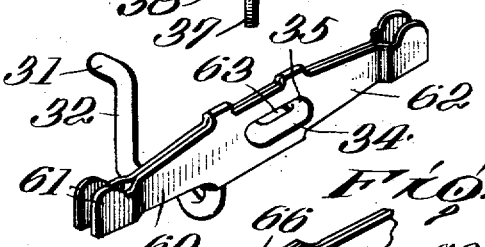
Fig. 12 is an enlarged perspective view showing the connection between the crank shaft and the contact blade.

The contact blade 60 is preferably made from a blank 62 by doubling it over upon itself so as to form a blade of the construction shown in Fig. 12, having spaced contact portions 61 at each end thereof. I propose further to provide the central portion of this contact blade with a slot 63 of such size and shape that the non-circular end of the crank shaft, formed by the portions 31, 34 and 35, is received in this slot. This makes a connection which is very simple and which transmits the oscillatory or snap movement of the crank shaft to the contact blade 60 but permits lateral displacement of the blade with respect to the crank shaft, so that the blade floats on the crank shaft and can adjust itself into alinement with the fixed contact jaws 17 and 21, yet the blade 60 may be slid on and off the crank shaft without the use of tools.

Figure 13:
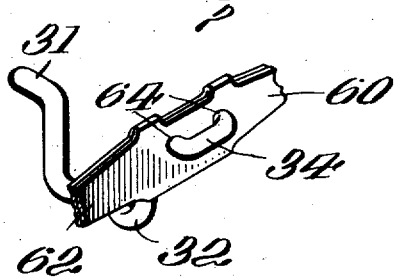
Fig. 13 is a perspective view showing a modified form of connection between the crank and the contact blade.

Instead of the connection shown in Fig. 12, the contact blade may be provided with two spaced holes 64 and the bearing portion 31 may extend through one of these holes while the portion 35 of the crank shaft extends through the other, as shown in Fig. 13. By thus weaving the end of the crank shaft through spaced holes in the contact blade, I secure a non-rigid connection which transmits the snap movement of the crank to the contact blade but permits the lateral displacement above referred to.

Figure 14:
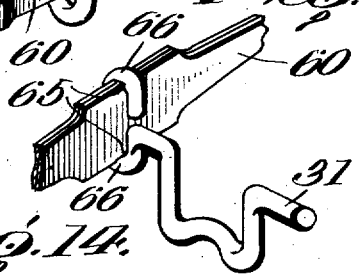
Fig. 14 is a perspective view showing another modified form of connection between the crank and the contact blade.

Another form of connection between the contact blade and the crank shaft is shown in Fig. 14. According to this form, the upper and lower edges of the contact blade are provided with notches 65 and the crank shaft has a loop 66 formed therein extending from one bearing portion 31, which loop engages the notches 65 and is wrapped around the central portion of the contact blade. This provides a non-rigid connection between the contact blade and the crank shaft by which the snap movement of the crank is transmitted to the blade while the ends of the latter are free for lateral displacement.

Figure 15:
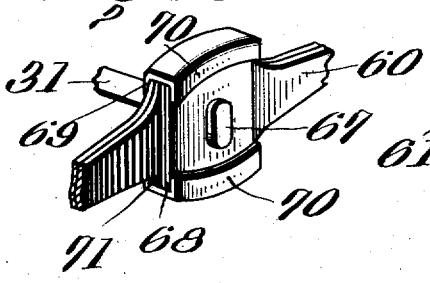
Fig. 15 is a perspective view showing a further modified form of connection between the crank and the contact blade.
Figure 17:
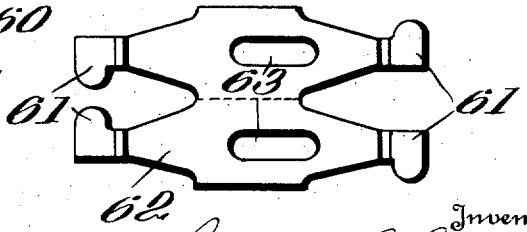
Fig. 17 is a plan view of the blank from which a contact blade is formed.

In Fig. 15, I have shown still another modified form of connection between the crank shaft and the blade. In this construction the contact blade is insulated from the crank shaft. Pieces 71 of insulating material are located on opposite sides of the central portion of the contact blade and are clamped against the blade by means of the members 68 and 69 the latter having overhanging flanges 70, which are bent over in front of the plate 68. The end 67 of the bearing portion 31 of the crank shaft has a non-circular formation which fits in non-circular holes in the plates 68 and 69. An enlarged hole is provided in the contact blade 60 through which this portion 67 passes without touching, so that the crank shaft is adequately insulated from the contact blade.

Figure 16:
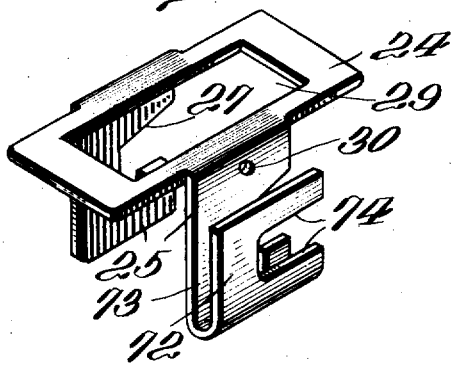
Fig. 16 is a perspective view showing a modified form of bracket, which may serve for guiding the floating contact blade into engagement with the contact jaws.

It will be observed that the contact blade 60 is of double formation, providing at each end a pair of resiliently spaced contact members which are adapted to receive between them one of the contact jaws. This contact blade is so mounted on and connected to the end of the crank shaft as to float thereon, and it works in the slot 12 which is comparatively narrow, with the result that the walls of the slot serve to so guide the floating contact blade as to bring the contact members thereon into proper cooperation with the contact jaws in said slot. In Fig. 16, I have shown a modified construction of the bracket 24, which serves the function of guiding the floating contact blade 60 so as to bring it into proper cooperative relationship with the fixed contact jaws mounted on the base. In this modified construction, one side arm 25 of the bracket 24 has a flange 72 turned upwardly therefrom and spaced from said arm so as to provide the slot 73 between said arm and said flange. The contact blade 60 works in said slot and is guided thereby. The flange 72 may be provided with an entrance notch 74 which permits the assembly of the parts and gives passage to the end of the crank shaft during such assembly.

Figure 2:
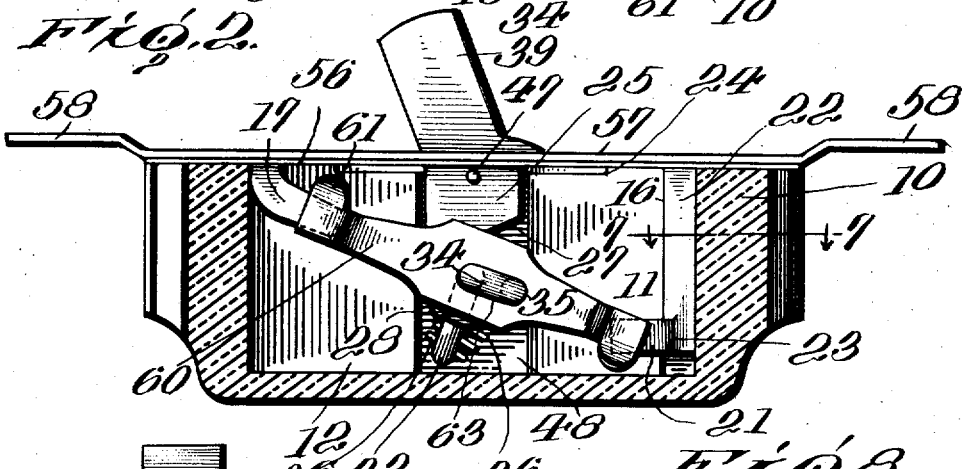
Fig. 2 is a vertical, sectional view through the switch, taken on the lines 2—2 of Fig. 1.
Figure 4:
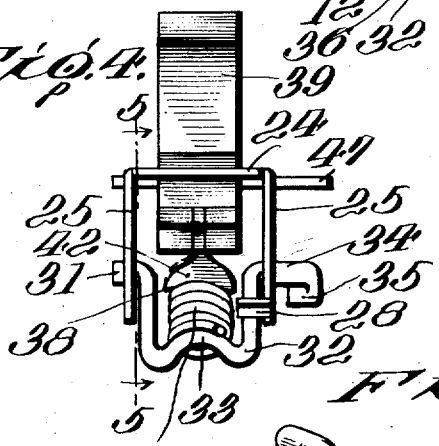
Fig. 4 is a view in end elevation of the operating assembly of the switch removed from the insulating base.
Figure 8:
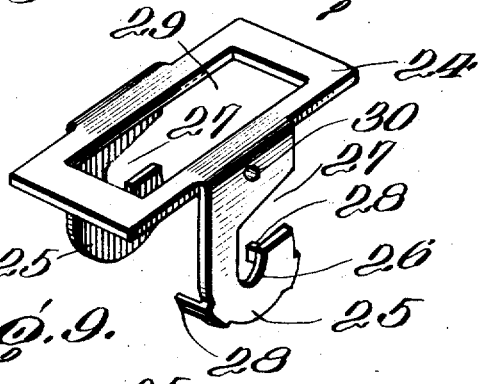
Fig. 8 is an enlarged perspective view of the bracket which forms a support for the operating parts.
Figure 9:
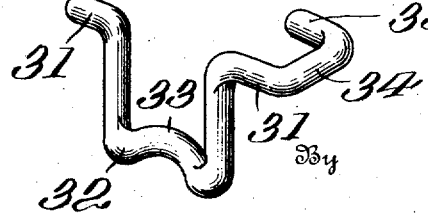
Fig. 9 is an enlarged perspective view of the crank shaft.
Figure 3:
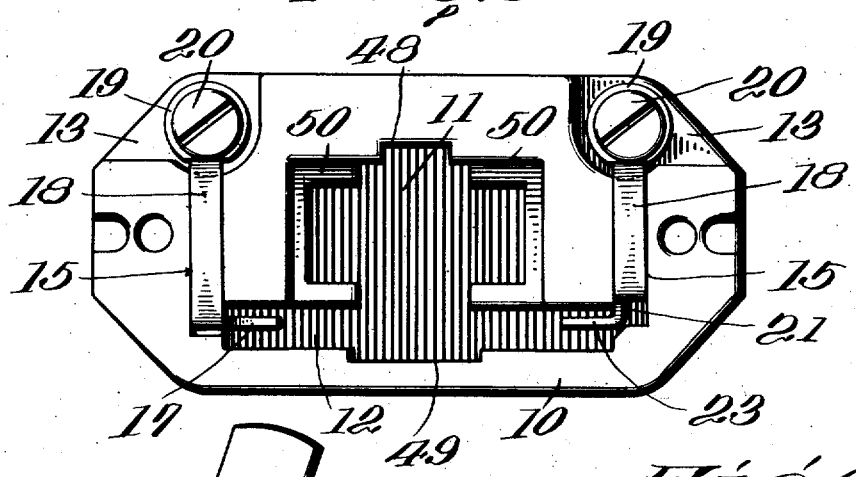
Fig. 3 is a plan view of the switch with the bridge plate and insulating strip removed.
Figure 5:
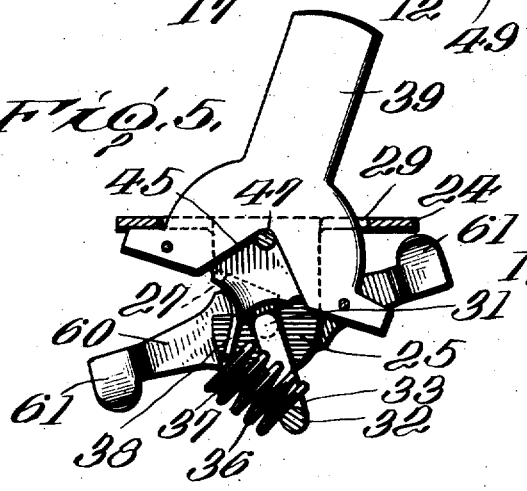
Fig. 5 is a sectional view, taken on the line 5—5 of Fig. 4.
Figure 6:
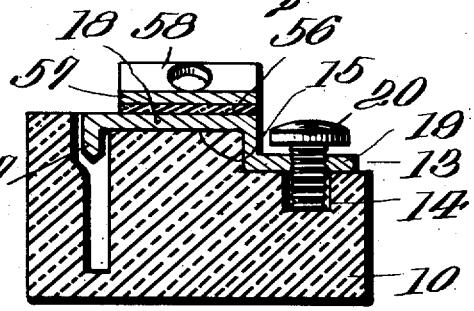
Fig. 6 is a sectional view taken on the line 6—6 of Fig. 1.

The operation of this switch construction should be apparent from the foregoing description. In Fig. 2, the parts of the switch are shown in position to close the circuit between the contact jaws 17 and 21. When the operator wishes to break the circuit, he moves the actuator lever 39 from the position shown in Fig. 2 to the right. This causes the lower end of the actuator lever to move from right to left and, since the spring seat 37 formed at the lower end of this lever acts upon the upper end of the spring 36 and compresses it between said seat and the crank portion of the crank shaft, the movement of the lower end of the actuator lever from right to left will first tend to compress more strongly the spring 36 and then, as the lower end of the actuator lever passes the center line, this compressed spring will act upon the crank portion of the crank shaft 31 and impart a snap movement of oscillation thereto, which causes the crank shaft to rotate quickly and swing the contact blade 60 out of engagement with the contact jaws 17 and 21. A movement of the actuator lever from right to left will correspondingly impart a snap movement to the crank shaft and the contact blade mounted thereon, which will carry the contact blade into engagement with the jaws and close the circuit once more.

It will be noted that the walls of the slot 12 are close to the path of movement of the contact blade 60. When the circuit is broken, there is a tendency for the creation of an arc between the end of the contact blade and the adjacent contact jaw but the walls of the slot are located so close to the path of movement of the contact blade and are formed of material having such heat absorbing qualities that the heat is absorbed by the walls of the slot and the air does not increase in temperature to a point sufficient to create an arc. Furthermore, the weight of the moving parts is greatly reduced by the form of the connection between the contact blade and the crank shaft and consequently these parts can move more rapidly than if they were heavier. The result is that the increased speed of movement of the contact blade also aids in preventing the formation of an arc. There is also a tendency for the formation of an arc between the end of the contact blade and the vertical lead portion 22 connected with the lower contact jaw 21, but I have prevented this by placing such vertical lead portion in the offset recess 16 at the end of the slot 12. Consequently, the corner or shoulder formed at the edge of the recess 16 is interposed as a solid barrier of insulating material between said vertical lead 22 and the path of the contact blade 60 and prevents arcing at this point.

The cooperation of the transverse portions 18 of the contact members and the transverse grooves 15 in the base serves to prevent any movement of these contact jaws lengthwise of the slot 12. Movement of these contact jaws transversely of the slot is prevented by the projection of the binding screws 20 into the holes 14 of the terminal seats. The vertical movement of the contact jaws in the slot is prevented by the clamping action of the bridge plate 57 which confines the contact members against vertical movement. This makes a very simple and cheap assembly which eliminates two fastening screws customarily employed heretofore for the purpose of fastening the contact jaws to the base.

The bracket 24 is seated in the seat 50 formed at the upper surface of the insulating base, and this seat confines said bracket against movement except in a vertical direction. The bridge plate serves to clamp this bracket, and the operating parts carried thereby, against vertical movement so that this provides a very simple and cheap construction in which the assembly can be performed very quickly and expeditiously and the parts securely clamped in place merely by screwing the bridge plate in position.

The connection between the contact blade and the crank shaft is an exceedingly simple one. Unlike prior constructions, no effort has been made to connect the contact blade rigidly with the crank shaft. The connection between the contact blade and the crank shaft is such as to transmit oscillatory or snap movement from the crank to the blade, but the blade floats upon the crank shaft, that is, it is free to be displaced laterally with respect thereto. Wherever, in the specification or claims, I refer to the contact blade "floating" upon the crank, I mean a connection between the blade and crank having the above characteristics. This results in economy in material as it eliminates the comparatively expensive element usually provided for fastening the contact blade to the crank shaft, lightens these parts, and further, provides a construction in which it is not necessary to adjust the fixed contact jaws into alinement with the contact blade, as this blade floats upon the crank shaft and adjusts itself, with the aid of the slot formed in the base, into alinement with the said contact jaws.

Certain features of my invention are not limited to use in snap switches but may be used in connection with other electric switches. In so far as my invention is applicable only to snap switches, it is not to be limited to snap switches which are actuated by a lever as many features of it are also applicable to snap switches of the type which are actuated by a rocker member under the control of push buttons, for instance. Many features of my invention are also applicable to three-way and four-way switches, although in this particular instance I have described my invention as embodied in a two-way switch.

In connection with the appended claims and the subject-matter of my invention above described, attention is called to my copending application, Serial No. 298,218, filed August 8, 1928, in which application I have elected to present claims which are generic to the forms of my invention disclosed herein and also disclosed in said application. This application on September 1, 1931, matured into Patent No. 1,821,180.

I am aware that my invention is susceptible of considerable variation without departing from the spirit thereof and, therefore, I desire to claim the invention broadly as indicated by the appended claims.

What I claim is:

1. In a snap switch, the combination of a bracket, a wire crank journaled thereon, one end of said crank being doubled back upon itself, operating means including a spring for imparting an oscillatory movement to said crank, and a contact blade having a slot receiving said doubled back end portion of the crank.

2. In a snap switch, the combination of a base of insulating material having a recess to receive the operating parts and a slot communicating with said recess, fixed contacts located in said slot, a bracket, a crank journaled thereon, operating means including a spring for imparting oscillatory movement to said crank, and a contact blade so connected to said crank as to receive oscillatory movement therefrom but free to be displaced laterally, the walls of said slot serving to guide said blade into operative engagement with said contacts.

3. In a snap switch, the combination of a base of insulating material, fixed contacts carried thereby, a bracket, a crank journaled thereon, operating means including a spring for imparting an oscillatory movement to said crank, a double contact blade cooperating with said fixed contacts, said double blade being so connected to said crank as to receive oscillatory movement therefrom but free to be displaced laterally, and means for guiding the said double blade into engagement with said contacts.

4. In a snap switch, the combination of a bracket, a crank shaft journaled thereon, a contact blade carried by said crank shaft, an actuator lever having a body of sheet metal the lower portion of which is twisted into a plane at right angles to the upper portion and provided with a spring seat, said lever being pivoted upon said bracket, and a spring compressed between the spring seat and the crank shaft.

5. In a snap switch, the combination of a bracket, a crank shaft journaled thereon, a contact blade carried by said crank shaft, a sheet metal actuator lever pivoted on and extending through said bracket and having a depending lower end provided with a spring seat and laterally projecting arms adapted to contact with the lower face of said bracket to limit movement of said lever, and a spring compressed between the spring seat and the crank portion of said crank shaft.

6. In a snap switch, the combination of a bracket, a crank shaft journaled thereon, a contact blade carried by said crank, an actuator lever pivoted on and extending through said bracket and including a sheet metal body having a depending lower end provided with a spring seat and laterally projecting arms adapted to contact with the lower face of the bracket to limit movement of said lever, and insulation molded about the upper portion of said sheet metal member including the arms, and a spring compressed between the spring seat and the crank portion of said crank shaft.

7. In a snap switch, the combination of a bracket, a crank shaft journaled thereon, a contact blade carried by said crank shaft, an actuator lever pivoted on and extending through said bracket and including a sheet metal body having a depending lower end with an arcuate edge provided with shoulders at each end thereof to form a spring seat, and a spring interposed between the spring seat and the crank portion of said crank shaft, said arcuate portion of the actuator lever projecting into the helix of the spring to prevent displacement thereof.

8. In a snap switch, the combination of a base of insulating material having a recess therein, an operating assembly including a bracket, a crank journaled thereon, a spring, and an actuator lever pivoted on said bracket, the walls of said recess engaging the bracket to prevent horizontal movement thereof, and a bridge plate fastened to the base and extending over said bracket to prevent vertical movement thereof.

9. In a snap switch, the combination of a base of insulating material having a recess therein, an operating assembly including a bracket, a crank journaled thereon, a spring and an actuator lever pivoted on said bracket, the walls of said recess engaging the bracket to prevent horizontal movement thereof, a strip of insulating material applied to the upper surface of the base and extending over said bracket, and a bridge plate fastened to said base and clamping said strip of insulating material in position over said base to prevent vertical movement of the bracket with respect thereto.

10. In a snap switch, the combination of a base of insulating material having a recess therein provided with a seat surrounding the upper edge of said recess, an operating assembly including a bracket, a crank journaled thereon, a spring and an actuator lever pivoted on said bracket, the top plate of said bracket fitting said seat and held against horizontal movement thereby, and a bridge plate fastened to the base and clamping said bracket in position in said seat to prevent vertical movement thereof.

11. In a snap switch, the combination of a support; a wire crank journalled on the support, one end of said crank being doubled back upon itself to form an open loop, operating means for the crank to cause it to oscillate from one position of rest to another; and a contact blade having an opening through which the looped end of the wire may be passed to support the contact blade thereon.

12. In a snap switch, the combination of a support; a wire crank journalled on the support, one end of said crank being doubled back upon itself to form an open loop; operating means for the crank to cause it to oscillate from one position of rest to another; and a contact blade having a bearing portion through which the looped end of the wire may be passed to support the contact blade thereon, said looped portion of the wire freely passing through said bearing portion to render the supporting of the contact blade thereon non-rigid.

13. In a snap switch, the combination of a support; a crank journaled on the support, one end of said crank being non-circular; operating means for the crank to cause it to oscillate from one position of rest to another; and a contact blade having a laterally floating connection with the non-circular end portion of the crank.

14. In a snap switch, the combination of a support; a crank journaled on the support, said crank having an extension; operating means for the crank to cause it to oscillate from one position of rest to another; and a contact blade having means therein in which the crank extension lies, and the contact blade being supported by the extension so that the ends of the contact blades are free for lateral displacement.

15. In a snap switch, the combination of a body; a bracket; a crank journaled on the bracket, said crank having an extension; operating means for the crank to cause it to oscillate from one position of rest to another; contact jaws mounted on the body; a switch blade having ends engaging the contact jaws and mounted on said crank extension for lateral displacement; and means for engaging the blade to guide the ends thereof into engagement with the contact jaws when the blade is oscillated.

16. In a snap switch, the combination of a base of insulating material having a recess to receive the operating parts and a slot communicating with said recess; fixed contacts located in said slot; a crank supported in the base for oscillatory movement; operating means including a spring for imparting oscillatory movement to the crank; and a contact blade so connected to said crank as to receive oscillatory movement therefrom but free to be displaced laterally, the walls of said slot serving to guide said blade into operative engagement with said contacts.

17. In a snap switch, the combination of a base of insulating material; fixed contacts carried thereby; a crank supported in the base for oscillatory movement; operating means including a spring for imparting oscillatory movement to said crank; a double contact blade cooperating with said fixed contacts, said double blade being so connected to said crank as to receive oscillatory movement therefrom but free to be displaced laterally and means for guiding said double blade into engagement with said contacts.

18. In a snap switch, the combination of a base of insulating material having a recess to receive the operating parts and a slot communicating with said recess; fixed contacts located in said slot; a crank supported in the base for oscillatory movement; operating means including a spring for imparting oscillatory movement to the crank; a contact blade so connected to said crank as to receive oscillatory movement therefrom but free to be displaced laterally; and means including one wall of said slot for guiding said blade into operative engagement with said contacts.

19. In a snap switch, the combination of a base of insulating material having a cavity to receive the operating parts; fixed contacts located in said cavity near one wall of the base; a crank supported in the base for oscillatory movement; operating means including a spring for imparting oscillatory movement to the crank; a contact blade so connected to said crank as to receive oscillatory movement therefrom but free to be displaced laterally; and means including the said wall of the base adjacent to which the contacts are located for guiding said blade into engagement with said contacts.

20. In an electric switch, a rocker; a crank; a spring interposed between the rocker and crank and adapted to cause the latter to oscillate with a snap action from one position of rest to another when the spring is carried by the rocker across the axis of oscillation of the crank; and a switch arm mounted on said crank for oscillation therewith and slidabdy mounted on the crank for bodily lateral movement unrestrained by the crank.

21. In an electric switch, a rocker; a crank; a spring interposed between the rocker and crank and adapted to cause the latter to oscillate with a snap action from one position of rest to another when the spring is carried by the rocker across the axis of oscillation of the crank; a switch arm having a bearing aperture; and a switch arm carrying portion on the crank shaped to fit the bearing aperture in the switch arm so as at all times to permit the switch arm to be slid on and off without the use of tools.

Signed at Bridgeport, in the county of Fairfield, and State of Connecticut, this 31st day of October, 1930.

ARTHUR C. GAYNOR.